United States Patent [19]
Howard

[11] 3,891,377
[45] June 24, 1975

[54] APPARATUS FOR FABRIC MOLDING

[75] Inventor: Jack E. Howard, Los Angeles, Calif.

[73] Assignee: International Fabric Molders, Inc., Los Angeles, Calif.

[22] Filed: June 22, 1973

[21] Appl. No.: 372,652

[52] U.S. Cl. ............... 425/383; 425/412; 264/324; 156/224
[51] Int. Cl. ........................ B29c 3/00; B29c 17/02
[58] Field of Search ........... 425/388, 412, 383, 406, 425/143, 384, 340; 156/224; 264/324

[56] References Cited
UNITED STATES PATENTS

| | | | |
|---|---|---|---|
| 2,521,282 | 9/1950 | Butler | 425/143 |
| 2,874,751 | 2/1959 | Morton | 425/407 |
| 3,025,566 | 3/1962 | Kostur | 425/388 |
| 3,058,154 | 10/1962 | Howard et al. | 156/224 X |
| 3,127,497 | 3/1964 | Taylor, Jr. | 425/143 |
| 3,167,816 | 2/1965 | Howard et al. | 425/384 |

Primary Examiner—Robert L. Spicer, Jr.
Attorney, Agent, or Firm—Robert C. Comstock

[57] ABSTRACT

An apparatus for moldng flat fabrics into three-dimensional shapes, such as breast cups, brassieres, garments and the like. The invention utilizes a conventional hydraulic press having molds which are movable vertically by a hydraulic ram into engagement with the fabric disposed between them. A reciprocally mounted heating rack is used for radially heating the fabric while it is disposed between the molds immediately prior to their closing. Electrically operated heating rods are provided adjacent the bases of the mold halves for conductively heating the molds. The invention provides for heating both the molds and fabric simultaneously to a lesser degree than in conventional hot and cold molding. The resulting molded fabric has all of the advantages of prior hot and cold molded fabrics, without their disadvantages.

3 Claims, 4 Drawing Figures

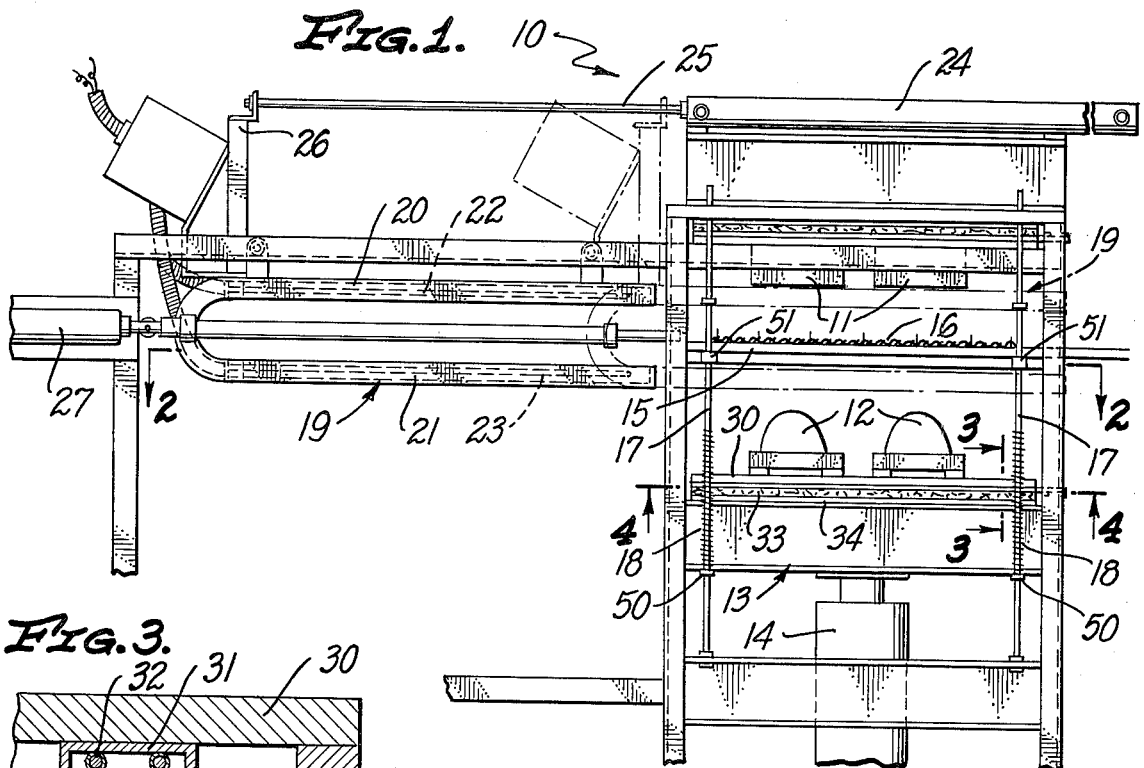
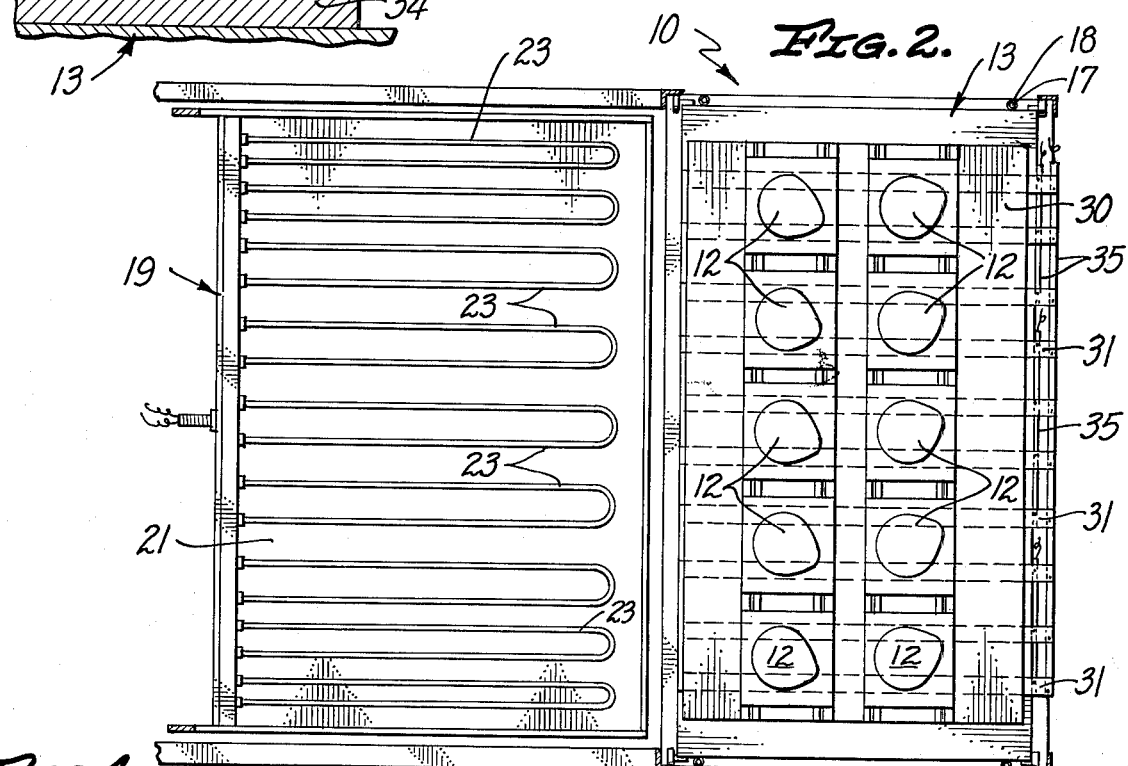
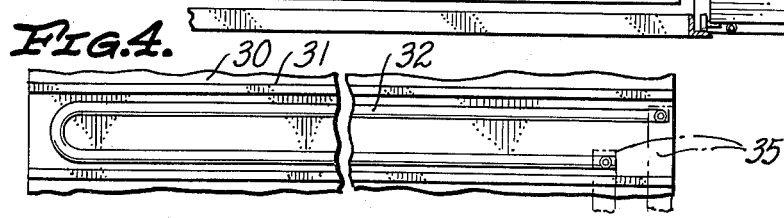

APPARATUS FOR FABRIC MOLDING

BACKGROUND OF THE INVENTION

1. Field of the Invention

The invention relates to an apparatus for molding flat fabrics into three-dimensional contours which is particularly designed and adapted for use in making breast cups, brassieres and other garments.

2. Description of the Prior Art

The prior art, as exemplified by U.S. Pat. No. 3,058,154 teaches molding flat fabric into a three-dimensional shape by heating one or both parts of a complementary two-part mold. The heat from the mold is imparted to the fabric, which is deformed into a three-dimensional shape corresponding to that of the molds.

The process, which is referred to in the trade as "hot molding" has several advantages. Because the molds are maintained at a constant heat, an accurately timed heating and cooling cycle is not required and the molding operation is accordingly fast. The hot molded fabric will stand up well under repeated laundering and will maintain its proper shape and size.

Hot molding, however, also has several disadvantages. One of these is that the fabric is often distorted, particularly at the apex of a breast cup or the breast cup portion of a brassiere. This occurs because the fabric is stretched to a greater degree in this area. Because the molded product is still hot when it is taken from the molds, it tends to distort or lose its shape at this time since it is still plastic but its shape is no longer maintained by engagement with the molds. A hot molded fabric also develops a harsh or stiff feel, which is particularly undesirable in a product which is worn next to the skin and which may cause irritation.

Another method taught by the prior art is "cold molding", in which the molds are left completely unheated and the fabric is heated prior to molding. This method is exemplified by prior U.S. Pat. No. 3,187,816. Cold molding provides a garment which has a much softer feel than one which is hot molded. There is generally less thinning at the apex and there is less distortion of the product after it is removed from the mold. On the other hand, the laundering qualities of the garment are greatly inferior to those of hot molded garments. A cold molded product tends to shrink and also to lose its shape, particularly when subjected to repeated hot water laundering.

There are accordingly disadvantages to both types of molding found in the prior art.

Molding presses and related equipment have in the past been designed and equipped exclusively for use in either hot or cold molding. This requires a substantial financial investment on the part of the molding operator and often means that one or the other press may be standing idle because it cannot be used to perform the particular molding operation required.

SUMMARY OF THE INVENTION

The primary object of the present invention is to teach a novel apparatus for fabric molding which achieves substantially all of the advantages of both molding methods taught by the prior art and which substantially eliminate the disadvantages or undesirable results of each of the prior art methods.

In essence, my invention contemplates apparatus for heating both the molds and the fabric, each to a somewhat lesser degree than when each method of heating was used individually. This has provided results which are suprising and unexpected to those skilled in the art. Among these results are the production of a finished molded garment which combines all of the advantages of both hot and cold molded garments while at the same time eliminating their various disadvantages.

This novel apparatus, which will be referred to as "double heating" (of both the fabric and the molds) provides a molded garment which has a softer feel than that of a hot molded garment. At the same time, it has better washability than a cold molded garment and will retain its size and contour through repeated laundering. There is a minimal amount of fabric distortion both at the apex during molding and when the product is removed from the molds. Less fabric is required than in cold molding and the quality of the molding achieved is superior to that of both prior art methods.

Another advantage of the invention is that the unlimited combination of variables provided by heating both the fabric and the molds to varying degrees makes the molding equipment so versatile that it can be used to mold substantially any fabric which is capable of being molded. It can even be used to mold fabrics which heretofore have been considered impossible to mold, such as lace.

Another advantage of the invention is that the same molding apparatus can also be used for conventional hot molding or cold molding as well, making it unnecessary for the equipment to stand idle at any time, since it can perform any desired molding operation.

It is accordingly among the objects of the invention to provide an apparatus for fabric molding having all of the advantages and benefits set forth above and described hereinafter in this specification.

The invention also comprises such other objects, advantages and capabilities as will later more fully appear and which are inherently possessed by the invention.

While I have shown in the accompanying drawings a preferred embodiment of the invention, it should be understood that the same is susceptible of modification and change without departing from the spirit of the invention.

DESCRIPTION OF THE DRAWINGS

FIG. 1 is a side elevational view of a molding press constructed in accordance with my invention, with the fabric heating structure shown in retracted position, the operating or heating position being shown in phantom lines;

FIG. 2 is a sectional view of the same, taken on line 2—2 of FIG. 1;

FIG. 3 is a partial transverse sectional view of the mold base, taken on line 3—3 of FIG. 1;

FIG. 4 is a partial longitudinal sectional view of a mold base, including a mold heating element, taken on line 4—4 of FIG. 1.

DESCRIPTION OF THE PREFERRED EMBODIMENT

A preferred embodiment which has been selected to illustrate the invention comprises a hydraulic press 10 in which a plurality of inverted female molds 11 are held in a stationary position, while a plurality of complementary male molds 12 are mounted on a support member 13 which is reciprocally moved in a vertical direction by a hydraulic ram 14 which has the upper end of its piston connected to the support member 13.

A fabric frame 15 extends horizontally between the molds 11 and 12 and is adapted to hold one or more layers of fabric 16 for molding. The frame 15 is mounted for vertical movement on vertically directed guide rods 17. Coil springs 18 mounted on the guide rods 17 are supported at their lower ends by flanges 50 secured to the lower edge of the support member 13. As the support member 13 is moved upwardly by the ram 14, the upper ends of the coil springs 18 engage flanges 51 secured to the frame 15 and carry the frame 15 and fabric 16 upwardly when the molds are closed.

A substantially U-shaped heater rack 19 is mounted for sliding horizontal movement between two positions, in one of which its upper portion 20 and lower portion 21 are disposed directly above and beneath the fabric 16 and extend substantially parallel thereto. This is the heating or operating position, in which heat is applied to the fabric 16 and prepare it for the molding operation. This position of the heater rack 19 is shown in phantom lines in FIG. 1 of the drawings.

The heater rack 19 is movable from this position to a retracted or non-operating position in which it is slidably moved horizontally outwardly so that the molds can be closed to perform the molding operation after the fabric 16 has been sufficiently heated. This position of the heater rack 19 is shown in solid lines in FIGS. 1 and 2 of the drawings.

The upper portion 20 and lower portion 21 of the heater rack 19 have a plurality of electrically operated U-shaped heating rods which are best shown in FIG. 2 of the drawings.

Reciprocal movement of the heater rack 19 is effected by the operation of a hydraulic cylinder 24, which is mounted on the upper part of the hydraulic press 10. The end of its piston 25 is connected to a vertically directed arm 26 which is in turn connected to the heater rack 19. A shock absorber 27 is provided to cushion the movement of the heater rack 19.

The male molds 12 are mounted on a metal mounting plate 30, beneath which are a plurality of longitudinally directed channels 31, each of which contains a U-shaped heating rod 32. Beneath the heating rods 32 is a thick section of suitable insulating material 33, beneath which are a base plate 34 and the support member 13. A similar inverted structural assembly is provided for the female molds 11. Bus bars 35 are provided for supplying electricity to the heating rods 32. It will be obvious that heat from the heating rods 32 is conveyed through the mounting plates 30 to the male and female molds 11 and 12.

In use, the molds 11 and 12 are preferably continuously heated to whatever temperature is suitable for the particular molding operation involved. One or more layers of fabric 16 are mounted on the frame 17 and then heated immediately prior to the closing of the molds. The cylinder 24 is energized to move the heater rack 19 to its operating position surrounding the fabric 16. Heat from the heating rods 22 and 23 is transferred by radiation to both sides of the fabric 16.

After the fabric 16 has been sufficiently heated, the heater rack 19 is retracted and the hydraulic ram 14 energized to move the support member 13 and male molds 12 upwardly.

The molds remain closed a short period of time while the molding operation is completed. The ram 14 is then released to retract its piston and thereby move the support member 13 and male molds 12 back down to their normal positions. The frame 15 moves back to its normal position and the molded fabric 16 is then removed from the frame 15.

Suitable micro-switches are provided to prevent the ram 14 from operating until the heater rack 19 is in its full retracted position and to prevent the heater rack 19 from moving to operating position until the molds are fully open.

The intensity and duration of heat which is applied to the fabric 16 and the molds 11 and 12 is controlled by means of a conventional electrical control panel. The control panel preferably includes a control for regulating the temperature applied to the molds 11 and 12. One or more additional controls are used for controlling the amount of heat applied to the fabric 16. A timing control is used to regulate the amount of time during which heat is applied to the fabric 16. Another timing control regulates the amount of time the molds are closed.

I claim:

1. In an apparatus for molding flat thermoplastic fabric material into three dimensional contours which includes a hydraulic press having complementary male and female molds disposed in alignment with each other and means for moving said molds into engagement with each other with said fabric disposed between said molds, the improvement which comprises means for heating said molds, independent means for simultaneously radially heating said fabric immediately prior to molding, and means for controlling said heating and molding, both said molds and fabric being heated to a lesser degree of heat than if either the molds or the fabric were heated alone to such a degree for an adequate shaping as in conventional hot and cold molding, whereby said fabric, when molded with said lesser degree of heat, in both the molds and fabric, has better laundering qualities than conventional cold molded fabric and a softer feel and less distortion than conventional hot molded fabric.

2. The structure described in claim 1, in which said fabric is mounted on a rack movable into a position between said molds, said means for heating said fabric comprising a heater rack mounted for reciprocal movement into a position between said molds parallel to said fabric, said means for heating said molds comprising electrically operated conductive heating rods disposed beneath said molds.

3. The structure described in claim 2, and means for separately controlling the heating of said molds, the heating of said fabric and the duration of said fabric heating and molding, whereby the heating and molding temperature and duration can be varied for different types of fabric and whereby the same hydraulic press can be used for hot molding by heating only said molds, for cold molding by heating only said fabric and for combination molding in which said molds and fabric are heated simultaneously.

* * * * *